United States Patent [19]
Taylor

[11] Patent Number: 4,503,878
[45] Date of Patent: Mar. 12, 1985

[54] CHOKE VALVE

[75] Inventor: Kennard W. Taylor, Houston, Tex.

[73] Assignee: Cameron Iron Works, Inc., Houston, Tex.

[21] Appl. No.: 490,183

[22] Filed: Apr. 29, 1983

[51] Int. Cl.³ .............................................. F16K 43/00
[52] U.S. Cl. .................... 137/315; 137/454.6; 251/122; 251/333; 251/360; 285/308; 137/375
[58] Field of Search ................. 137/315, 454.2, 454.4, 137/454.5, 454.6, 375; 251/122, 360, 318, 333; 285/308, 318, 404

[56] References Cited

U.S. PATENT DOCUMENTS

| | | | |
|---|---|---|---|
| 3,180,420 | 4/1965 | Manson, Jr. et al. | 137/454.2 |
| 3,204,655 | 9/1965 | Bredtschneider | 285/404 |
| 3,454,035 | 7/1969 | Jespersen | 137/315 |
| 3,829,059 | 8/1974 | Rupert | 137/315 |
| 4,128,109 | 12/1978 | Chervenak et al. | 137/375 |
| 4,336,824 | 6/1982 | Steineman | 137/315 |
| 4,337,788 | 7/1982 | Seger | 137/315 |

FOREIGN PATENT DOCUMENTS 1561159  2/1980  United Kingdom ............ 137/454.6

*Primary Examiner*—George L. Walton
*Attorney, Agent, or Firm*—Vinson & Elkins

[57] ABSTRACT

A valve having a body with a valve chamber therein, an inlet into the valve chamber, an outlet from the valve chamber and an opening to the valve chamber aligned with the outlet, a bonnet secured to the body covering the opening, and having a tubular projection, a valve seat insert having a valve seat positioned in said outlet, a valve member, means for moving the valve member toward and away from the valve seat to control flow from the valve, means for releasably securing the valve seat insert to the bonnet tubular projection.

4 Claims, 3 Drawing Figures

CHOKE VALVE

BACKGROUND

Prior valves, such as chokes, used to control high velocity flow which is damaging to the valve seat have utilized a replaceable valve seat insert including a blast tube which has generally been threaded into the body in the outlet. When such valves have been used they have been subject to wear and the valve seat insert is difficult to remove and replace since the hex head of the insert is subject to wear and may not be easily engaged and sometimes is extremely difficult to remove.

In one prior choke the bonnet is provided with a tubular projection extending into the body chamber and into the body outlet with the inlet extending into the tubular projection. Cam actuated pins are used to engage the tubular projection to retain the bonnet in the body. The valve member and seat include a pair of discs with openings therein which can register or be restricted by rotation of the valving disc. The seat disc rests on a shoulder positioned in the bore of the tubular member. Another prior choke is shown in European Petroleum Conference Paper EUR 370 "New Subsea Choke and Choke Calibration System" as presented at the European Petroleum Conference in London, England in October 1982. This choke uses locking dogs to engage the tubular projection to retain the bonnet in the body. This choke also uses a pair of discs which rotate relative to each other to open or restrict the flow area. Such structures do not include a tapered plug valve member and an annular valve seat, both of which are of a material which is resistant to the erosion of high velocity fluid flow and are removable as a unit.

SUMMARY

The present invention provides an improved valve such as an angle choke having a body having an inlet, a valve chamber and an outlet, a bonnet secured to the body covering the opening into the valve chamber and aligned with the outlet, the bonnet having a tubular projection extending into the outlet, a valve seat insert having a blast tube therein and means for releasably securing the valve seat insert to the bonnet tubular projection, a valve gate member movably mounted in the bonnet to coact with the blast tube to control flow through the valve.

An object of the prevent invention is to provide an improved valve, such as a choke, having an easily replaceable valve seat insert.

Another object is to provide an improved valve with a valve seat insert which is removable independent of the wear it has been subjected to by the flow therethrough.

BRIEF DESCRIPTION OF THE DRAWINGS

These and other objects and advantages are hereinafter set forth and explained with respect to the drawings wherein.

DESCRIPTION OF THE PREFERRED EMBODIMENT

Valve 10 of the present invention as illustrated is generally called an adjustable choke which is designed to reduce the pressure of the stream flowing therethrough and as a result the valve member and valve seat are subjected to high velocity fluids.

Figure 1:
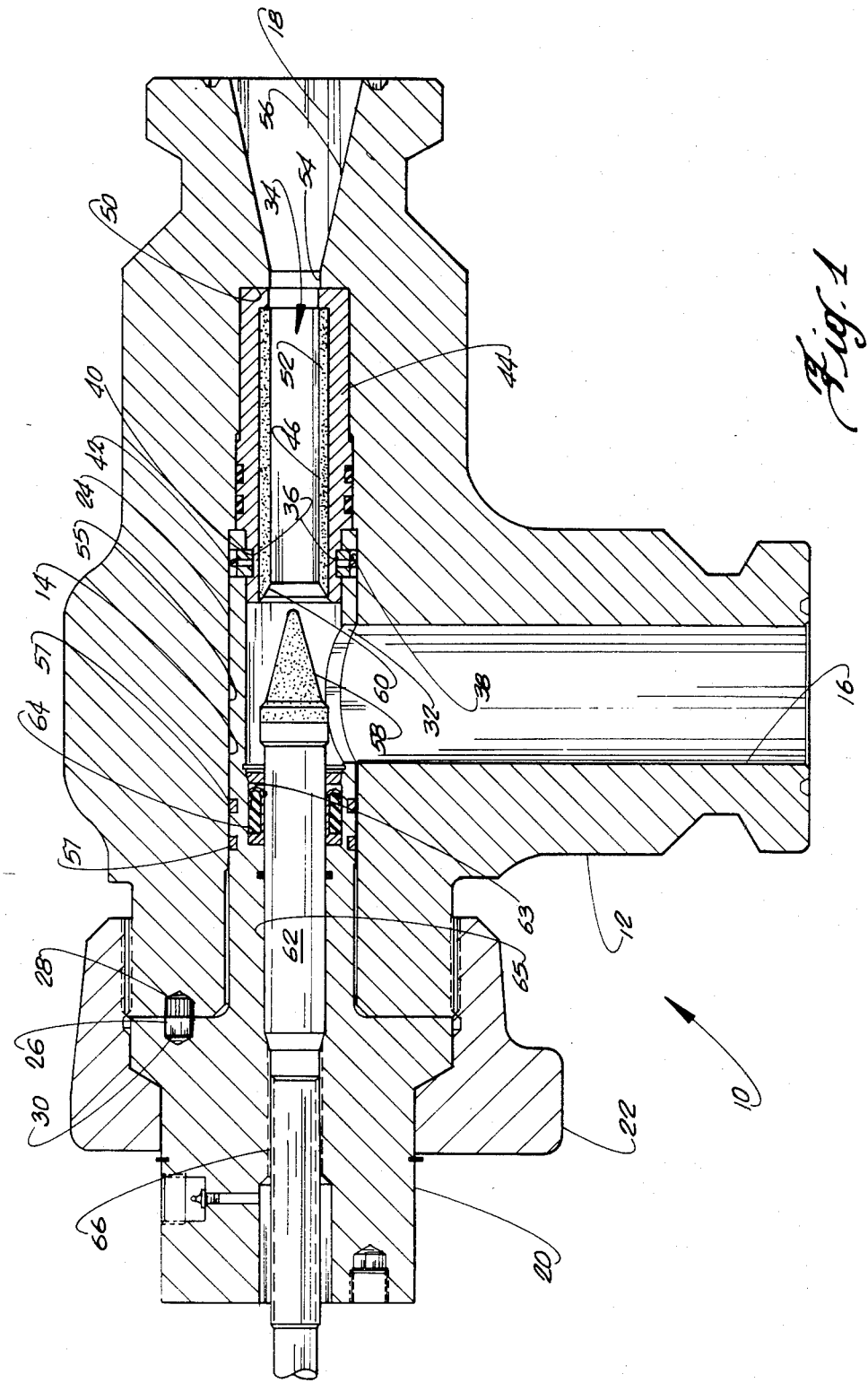
FIG. 1 is a sectional view of the improved valve of the present invention.

As shown in FIG. 1 the improved valve 10 includes body 12 having valve chamber 14, inlet 16 into chamber 14 and outlet 18 from chamber 14. Bonnet 20 is secured to body 12 by nut 22 and includes tubular projection 24 extending through valve chamber 14. Alignment pin 26 is positioned in opening 28 in body 12 and is adapted to be received in opening 30 in bonnet 20 to align bonnet 20 so that port 32 in tubular projection 24 registers with inlet 16.

Valve seat insert 34 is releasably secured to tubular projection 24 by suitable means such as pins 36 positioned in windows 38 in projection 24 and held in groove 40 in insert 34 by resilient ring 42. Resilient ring 42 is positioned in second groove 43 and is shown as an O-ring but may be any other type of resilient ring to retain pins 36 in recesses 40. Valve seat insert 34 includes sleeve 44 with blast tube 46 secured within sleeve 44 by suitable means such as silver solder. Blast tube 46 is preferably made of a material such as tungsten carbide or silicon carbide which is highly resistant to the erosive action of a high velocity fluid stream flowing therethrough. When installed with projection 24 valve seat insert 34 is positioned in bore 48 of outlet 18 against shoulder 50. Bore 54 of outlet 18 is a continuation of bore 52 of blast tube 46 immediately outward of shoulder 50. The outer portion of outlet 18 diverges at 56 as shown. Tubular projection 24 is sealed in counterbore 55 of valve chamber 14 by resilient seals 57. Valve seat insert 34 is sealed in counterbore 49 of valve chamber 14 by resilient seals 51.

Valve member 58 in the form of a tapered plug is positioned within tubular projection 24 and is adapted to coact with the convergent inlet 60 of blast tube 46 to control the flow through valve 10. Valve member 58 is connected to stem 62 by suitable means such as silver solder and is operated by a handwheel (not shown). Seal 64 is positioned between stem 62 and the interior surface 63 of tubular projection 24 to effectively seal about the exterior surface 65 of stem 62.

Figure 2:
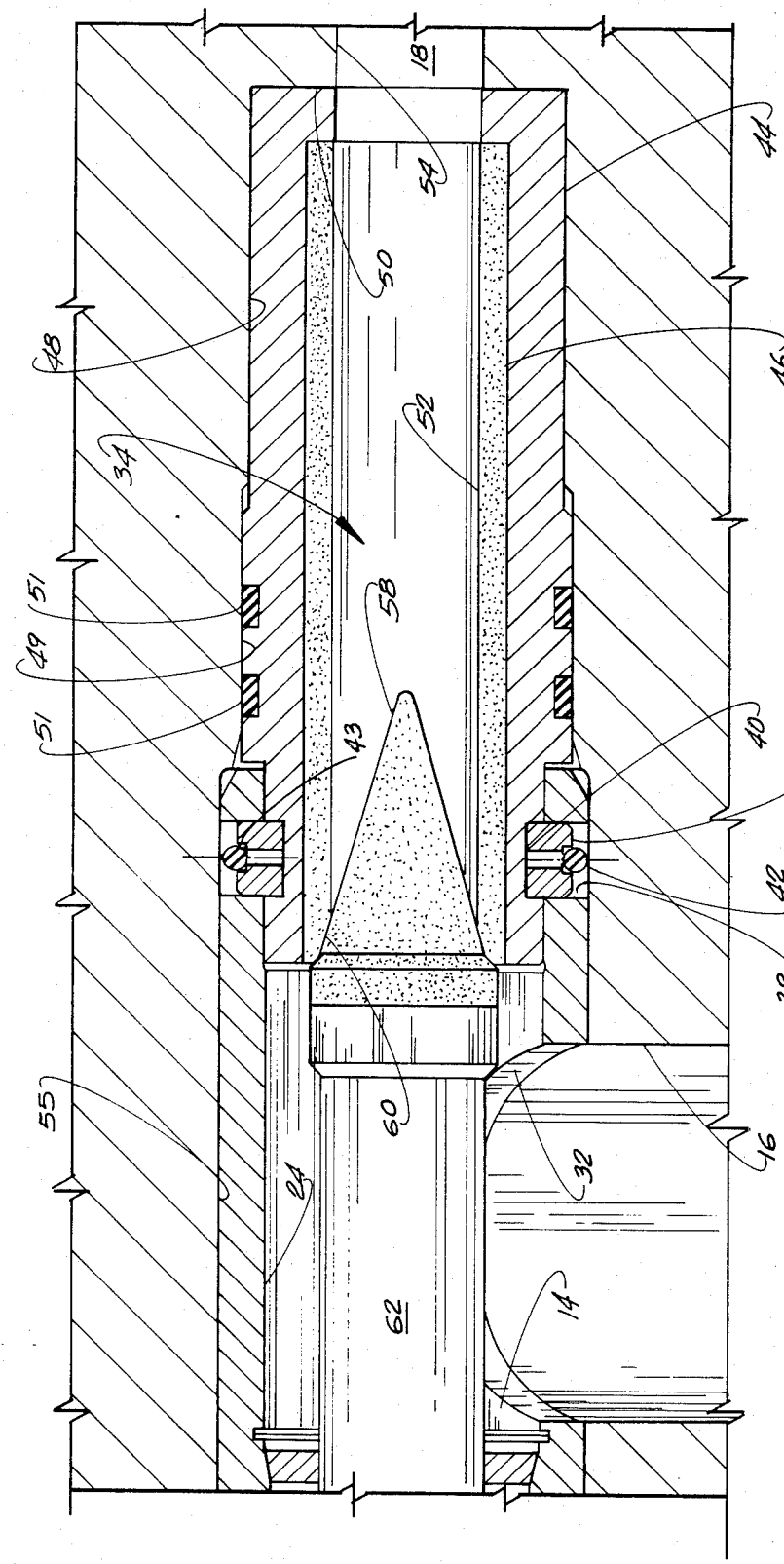
FIG. 2 is an enlarged partial sectional view to illustrate the valve seat insert and its engagement with the tubular projection of the bonnet.
Figure 3:
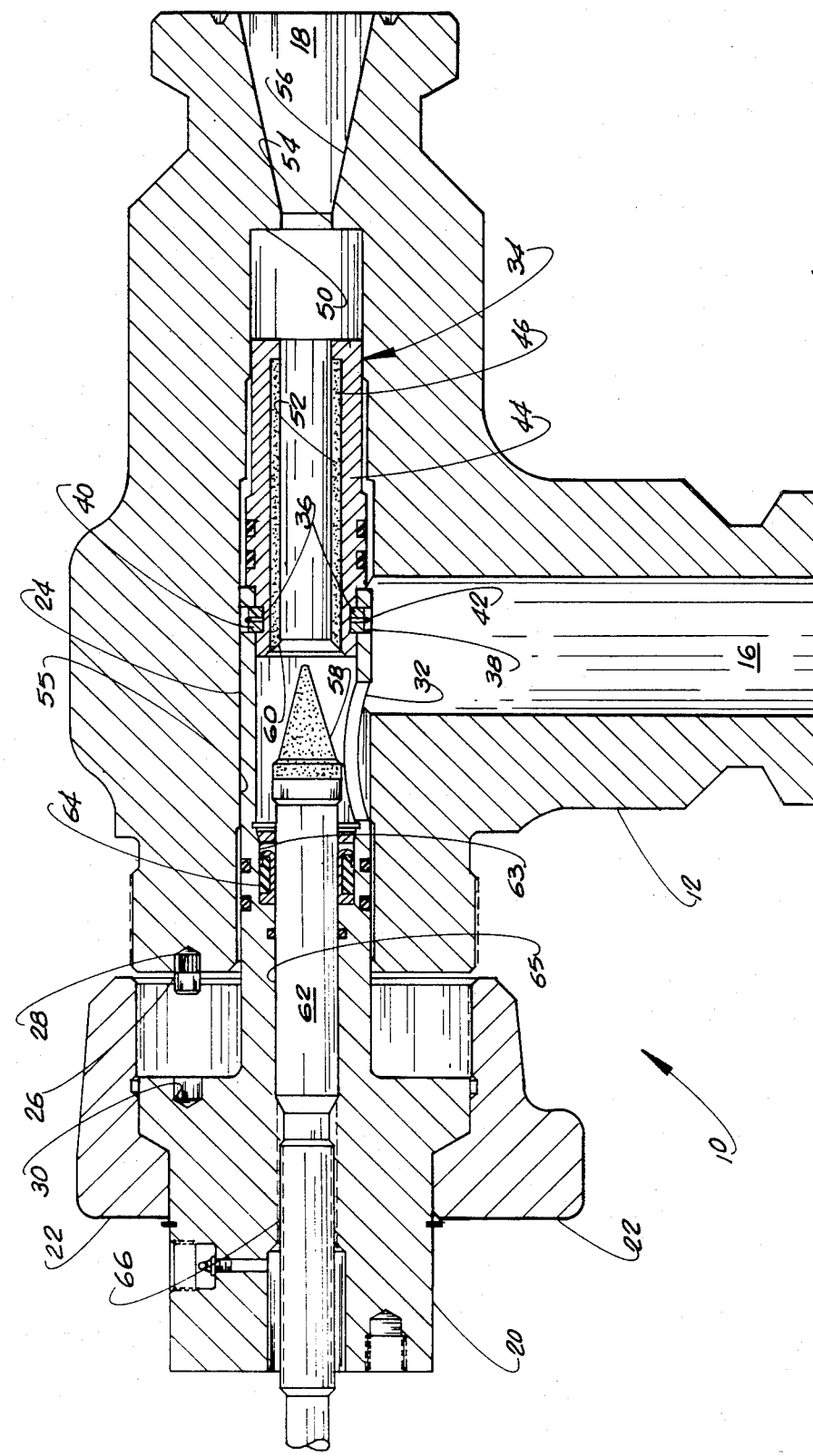
FIG. 3 is a sectional view similar to FIG. 1 but with the bonnet released from the body and being partially withdrawn from the body with the valve seat insert in the bonnet's tubular projection.

Rotation of the handwheel causes stem 62, which is threadly connected in bonnet 20 by threads 66, to rotate which causes plug 58 to move toward or away from inlet 60 of blast tube 46 to control the flow through valve 10 from the fully opened position of FIG. 1 to the fully closed position of FIG. 2. Whenever valve seat insert 34 is to be inspected for wear or replaced, bonnet 20 is removed from body 12 by unthreading nut 22 and sliding bonnet 20 with integral tubular projection 24 and valve insert 34, which is secured to projection 24 by pins 36, out of body 12. Then resilient ring 42 is removed from engagement with the exterior of pins 36. Pins 36 are then withdrawn from recesses 40 and valve seat insert 34 is removed from the end of tubular projection 24. A new valve seat insert 34 can then be inserted into tubular projection 24 and pins 36 installed and retained by ring 42 to latch insert 34 into tubular projection 24.

What is claimed is:

1. An adjustable choke valve comprising
   a body having a valve chamber, an inlet to the valve chamber, an outlet from the valve chamber and an opening from said valve chamber aligned with said outlet,
   a bonnet secured to said body in covering relationship to the valve chamber opening and having a tubular projection extending into said valve chamber,
   a tubular valve seat insert having an external groove and a blast tube of erosion resistant material lining the interior of said insert and forming a valve seat at its inner end, a valve seat,
   a valve member for coacting with said valve seat to control flow through said valve, means for releasably securing said bonnet tubular projection to said groove in the exterior of said tubular valve insert to retain said insert positioned in said valve chamber and to remove said valve seat insert and said valve member on removal of said bonnet from said body as a single unit for inspection for wear and possible replacement, and
   means for moving the valve member toward and away from valve seat.

2. A valve according to claim 1 wherein said releasable securing means includes
   a window in said tubular projection,
   a pin in said window, and means urging said pin inwardly for retaining the pin partly in the window and partly in the groove in said insert.

3. A valve according to claim 2 wherein said retaining means includes
   a resilient ring positioned in a second groove around said tubular projection and engaging the exterior of the pin to retain it partly in the window and recess.

4. A valve according to claim 2 including
   a plurality of said windows in said tubular projection, and
   a pin in each of said windows,
   said retaining means retaining said pins partly in their windows and partly in said groove in said insert.

* * * * *